US009085399B2

(12) United States Patent
Fishel et al.

(10) Patent No.: US 9,085,399 B2

(45) **Date of Patent: *Jul. 21, 2015**

(54) BAG IN BOX CLEANABLE CONNECTOR SYSTEM

(75) Inventors: Michael Fishel, Atlanta, GA (US); Ian Darby, Leicester (GB); Chris Bowers, Iver Heath (GB)

(73) Assignee: The Coca-Cola Company, Atlanta, GA (US)

( * ) Notice: Subject to any disclaimer, the term of this patent is extended or adjusted under 35 U.S.C. 154(b) by 257 days.

This patent is subject to a terminal disclaimer.

(21) Appl. No.: 13/476,476

(22) Filed: May 21, 2012

(65) Prior Publication Data

US 2013/0306676 A1 Nov. 21, 2013

(51) Int. Cl.

| | |
|---|---|
| ***F16L 37/32*** | (2006.01) |
| ***B65D 77/06*** | (2006.01) |
| ***B67D 7/02*** | (2010.01) |
| ***B67D 3/00*** | (2006.01) |
| ***B67D 3/04*** | (2006.01) |

(52) U.S. Cl.

CPC ............ *B65D 77/067* (2013.01); *B67D 3/0067* (2013.01); *B67D 3/042* (2013.01); *B67D 3/043* (2013.01); *B67D 7/0294* (2013.01)

(58) Field of Classification Search

CPC .. B65D 77/067; B67D 7/0294; B67D 1/0831; B67D 1/0829; B67D 1/0835; B67D 3/042; B67D 3/0067; B67D 3/0043; F16L 37/32

USPC ......... 251/149.6, 144, 149.9, 149.1; 137/587, 137/588; 222/105, 152, 490

See application file for complete search history.

(56) References Cited

U.S. PATENT DOCUMENTS

| | | | | |
|---|---|---|---|---|
| 3,399,695 | A * | 9/1968 | Stehlin | 137/551 |
| 3,504,699 | A * | 4/1970 | Grise | 137/846 |
| 3,851,666 | A * | 12/1974 | Hammond | 137/614.04 |
| 3,941,149 | A * | 3/1976 | Mittleman | 137/493.1 |
| 4,137,930 | A * | 2/1979 | Scholle | 137/68.19 |
| 4,143,853 | A * | 3/1979 | Abramson | 251/149.1 |
| 4,286,636 | A * | 9/1981 | Credle | 141/114 |
| 4,334,551 | A * | 6/1982 | Pfister | 137/614.03 |

(Continued)

FOREIGN PATENT DOCUMENTS

| | | | |
|---|---|---|---|
| EP | 0 270 302 | A1 | 5/1988 |
| WO | 2004082756 | A1 | 9/2004 |
| WO | 2010047814 | A2 | 4/2010 |

*Primary Examiner* — John K Fristoe, Jr.
*Assistant Examiner* — David Colon Morales
(74) *Attorney, Agent, or Firm* — Sutherland Asbill & Brennan LLP

(57) ABSTRACT

A system and method for connecting a fluid within a product container such as a bag to a product dispenser. The system and method, more particularly, discloses a cleanable connector system for a Bag-In-Box ("BIB") type package having a valve arrangement that prevents the mixing of product within the bag and in the line. Various embodiments provide a connector system including a valve arrangement having a line-side valve and a bag-side valve, wherein the valve arrangement allows connection to a bag and to a line-side connector while preventing the product within the bag and in the line from mixing. The system and method improves the shelf life of products contained within the bag and reduces the risk of contamination of the bag, the line, and the product contained within the bag by minimizing the risk of introducing biological and other foreign material into the system when connecting the bag and the line.

11 Claims, 11 Drawing Sheets

(56) References Cited

U.S. PATENT DOCUMENTS

| | | | | | |
|---|---|---|---|---|---|
| 4,436,125 | A * | 3/1984 | Blenkush | 141/330 |
| 4,445,539 | A | 5/1984 | Credle | |
| 4,564,132 | A * | 1/1986 | Lloyd-Davies | 222/522 |
| 4,610,469 | A * | 9/1986 | Wolff-Mooij | 285/260 |
| 4,629,159 | A * | 12/1986 | Wellenstam | 251/149.6 |
| 4,700,744 | A * | 10/1987 | Rutter et al. | 137/614.04 |
| 4,948,014 | A * | 8/1990 | Rutter et al. | 222/83 |
| 5,004,123 | A * | 4/1991 | Stoody | 222/94 |
| 5,213,236 | A * | 5/1993 | Brown et al. | 222/212 |
| 5,255,699 | A * | 10/1993 | Herzan et al. | 137/1 |
| 5,445,186 | A * | 8/1995 | Richter et al. | 137/614.2 |
| 5,477,883 | A * | 12/1995 | Totten | 137/614.03 |
| 5,535,785 | A * | 7/1996 | Werge et al. | 137/843 |
| 5,655,687 | A * | 8/1997 | Fitten et al. | 222/212 |
| 5,697,410 | A * | 12/1997 | Rutter et al. | 141/346 |
| 5,815,182 | A * | 9/1998 | Otis et al. | 347/85 |
| 6,095,381 | A * | 8/2000 | Schwanenberg | 222/490 |
| 6,112,951 | A * | 9/2000 | Mueller | 222/490 |
| 6,142,446 | A * | 11/2000 | Leinsing | 251/149.1 |
| 6,347,785 | B1 * | 2/2002 | Copp et al. | 251/149.6 |
| 6,419,670 | B1 * | 7/2002 | Dikeman | 604/533 |
| 6,450,375 | B1 * | 9/2002 | Hins et al. | 222/491 |
| 7,044,441 | B2 * | 5/2006 | Doyle | 251/149.6 |
| 7,487,951 | B2 * | 2/2009 | Johnson | 251/149.1 |
| 7,500,582 | B2 * | 3/2009 | Pritchett et al. | 222/321.7 |
| 7,559,530 | B2 * | 7/2009 | Korogi et al. | 251/149.6 |
| 7,762,278 | B2 * | 7/2010 | Adams et al. | 137/614.04 |
| 7,766,304 | B2 * | 8/2010 | Phillips | 251/149.6 |
| 2002/0079704 | A1 * | 6/2002 | Rutter et al. | 285/391 |
| 2003/0136932 | A1 | 7/2003 | Doyle | |
| 2004/0200738 | A1 * | 10/2004 | Rovelli et al. | 206/217 |
| 2004/0227120 | A1 * | 11/2004 | Raybuck | 251/149.1 |
| 2004/0232374 | A1 * | 11/2004 | Rutter et al. | 251/149.6 |
| 2006/0049208 | A1 * | 3/2006 | Daansen | 222/212 |
| 2006/0065873 | A1 | 3/2006 | Doyle | |
| 2006/0111694 | A1 * | 5/2006 | Fukai et al. | 604/905 |
| 2006/0249536 | A1 | 11/2006 | Hartman et al. | |
| 2009/0232586 | A1 * | 9/2009 | Diodati et al. | 403/14 |
| 2009/0259175 | A1 * | 10/2009 | Nordgren | 604/30 |
| 2010/0116371 | A1 * | 5/2010 | Gaus | 137/855 |
| 2010/0133273 | A1 | 6/2010 | Thurman et al. | |
| 2010/0176151 | A1 * | 7/2010 | Johnson | 222/92 |
| 2013/0105015 | A1 | 5/2013 | Deo et al. | |

* cited by examiner

BAG IN BOX CLEANABLE CONNECTOR SYSTEM

I. FIELD OF THE INVENTION

The present disclosure relates generally to a cleanable connector system for a Bag-In-Box ("BIB") type package. More particularly, the present disclosure relates to a cleanable BIB connector system having a valve arrangement that prevents the mixing of product within the bag and in the line.

II. BACKGROUND OF THE INVENTION

In packaging, a bag-in-box or BIB is a type of container for the storage and transportation of liquids. It consists of a plastic bag seated inside a corrugated fiberboard box. BIB packages are well known for containing and dispensing liquids such as syrup for post-mix soft drink dispensers. The plastic bag has a spout for feeding the syrup to the post-mix beverage dispenser via a hose and a pump.

A typical self-sealing valve disposed in the fitment of a collapsible bag for use in a BIB dispensing system is disclosed in U.S. Pat. No. 4,445,539 to Credle issued May 1, 1984. As described in that patent a quick-disconnect line-side coupling is operatively associated with a self-sealing bag-side valve such that when the valves are coupled together the respective valve poppets of the bag-side valve open to permit the flow of syrup through the associated line-side connector to the beverage dispenser pump.

Currently used bag-side valves and line-side couplings are adequate for low viscosity carbonated beverages such as soft drinks but present problems when used with thicker liquids such as juices and especially with liquids containing particulates such as pulpy orange juice. Currently used systems are also designed for acidic beverages, which are less prone to microbial contamination. These systems however may experience contamination issues when used with less acidic liquids.

Other requirements for BIB systems are that they are easy to connect, they minimize contamination, minimize the potential for spill, they are easy to clean with standard regimes, and they ensure flow is adequate under normal operations.

III. SUMMARY OF THE INVENTION

The present disclosure relates to a self-sealing bag-side valve in a bag-in-box (BIB) container for use with a quick-disconnect line-side coupling. More specifically, the present disclosure relates to an improved bag-side valve and improved line-side coupling.

The issues discussed above are addressed by the present disclosure. A push and lock connection is used instead of the previously used and unreliable screw connection. This reduces spillage and contamination.

The bag-side valve is a one-way valve formed of an elastomeric membrane. When fluid is not being pumped from the bag and through the system the valve is closed, reducing back flow into the bag and the contamination this can cause.

The plunger of the line-side coupling is enclosed by a sleeve (gator) so that the spring and other parts do not contact the fluid. This prevents them from being gummed up by particulates in the fluid and from being exposed to microbes. In addition, the flow path through the coupling is stream-lined so that potential areas of contamination are eliminated and the coupling remains as clean as possible during operation. Dead spots are reduced, orifices are enlarged and trap points are reduced or eliminated. Due to streamlining, flow through the coupling is higher, which further reduces accumulation of particulates or accumulation of sticky residue.

Cleaning of the equipment used with BIB systems involves clean-in-place (CIP) methods of blowing pressurized fluid through the line-side connector. Enclosed parts and streamlining of the fluid flow allow for more efficient clean-in-place (CIP) cleaning. In addition, the nose of the line-side coupling has an outer form surrounding it. This allows for cleaning of the nose during CIP.

The present disclosure provides several advantages over previous BIB connectors, particularly for use with fluids containing particulates and having a higher pH. The BIB connector has reduced contamination risk due to the one way bag-side valve, the push and lock connection means, the enclosed coupling spring, and the streamlined fluid flow path.

IV. BRIEF DESCRIPTION OF THE DRAWINGS

Given the following enabling description of the drawings, the disclosure should become evident to a person of ordinary skill in the art.

V. DETAILED DESCRIPTION OF THE DRAWINGS

The present disclosure, in at least one embodiment, describes a cleanable connector system for a Bag-In-Box ("BIB") type package. In at least one embodiment, the present disclosure provides a connector system including a valve arrangement having a line-side valve and a bag-side valve, wherein the valve arrangement allows connection to a bag and to a line-side connector while preventing the product within the bag and in the line from mixing. In at least one embodiment, the present disclosure improves the shelf life of products contained within the bag and reduces the risk of contamination of the bag, the line, and the product contained within the bag by minimizing the risk of introducing biological and other foreign material into the system when connecting the bag and the line.

Figure 1:
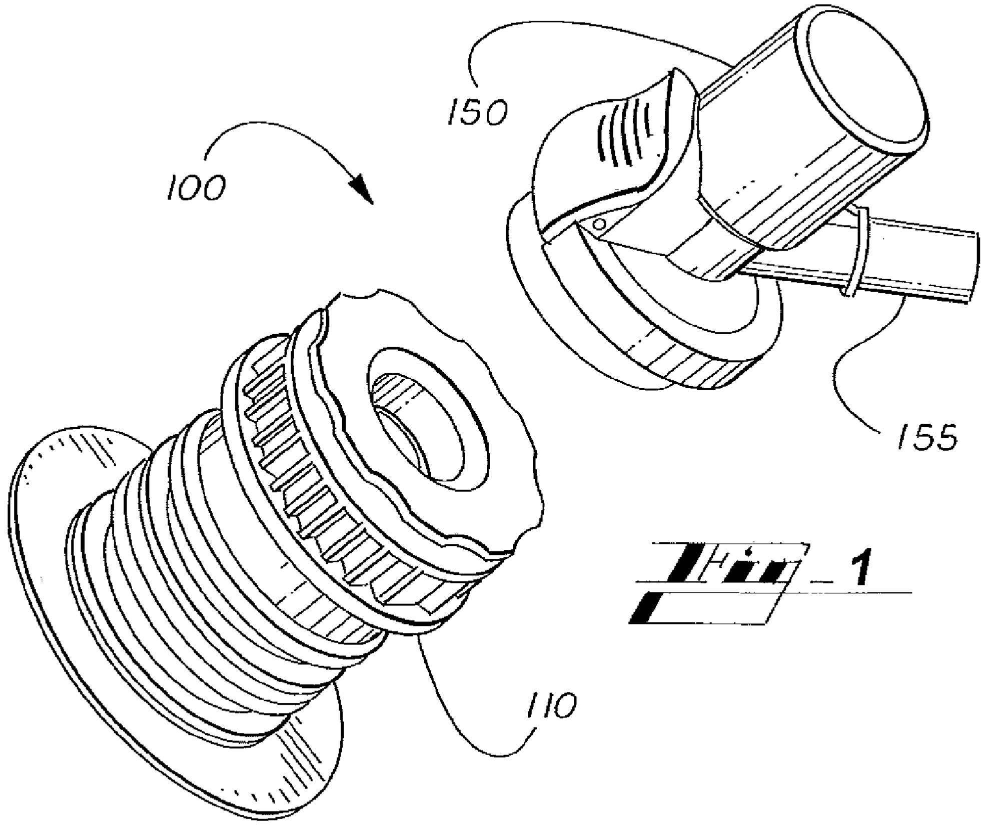
FIG. 1 illustrates a perspective view of an example of the connector system in accordance with an embodiment of the present disclosure, including a bag-side connector and a line-side connector.

FIGS. 1-9 illustrate various aspects of a BIB connector system 100 in accordance with at least one embodiment of present disclosure. As shown in FIG. 1, the connector system 100 includes a bag-side connector 110 and a line-side connector 150. The bag-side connector 110 is arranged and configured to connect to a bag gland (not shown) that stores a product to be dispensed. The line-side valve 150 is arranged and configured to connect to a line (not shown). As will be discussed more thoroughly below, the bag-side connector 110 and the line-side connector 150 are arranged and configured to engage in a manner that facilitates dispensing the product stored in the bag gland via the line-side connector 150. In at least some embodiments, the bodies of the bag-side connector 110 and the line-side connector 150 are preferably each formed into a one-piece body from a resilient, food-safe material, such as stainless steel, thermoplastic polyethylene terephthalate (PET), polyethylene (PE), or polypropylene (PP), which reduces the risk of compromise during cleaning.

Figure 2:
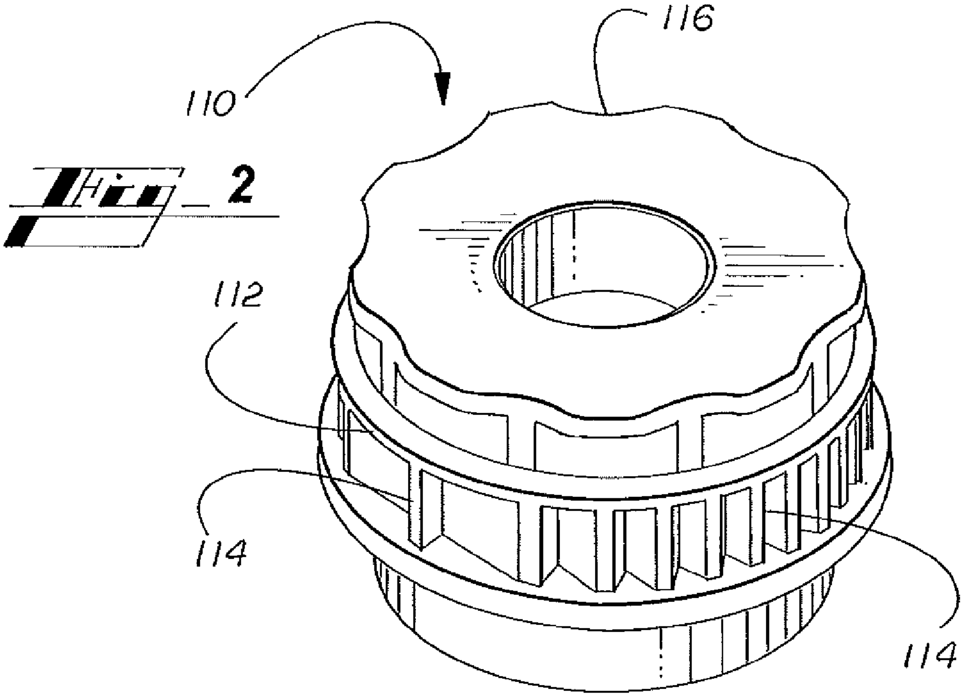
FIGS. 2-4 illustrate perspective views of an example of the bag-side connector in accordance with an embodiment of the present disclosure.
Figure 3:
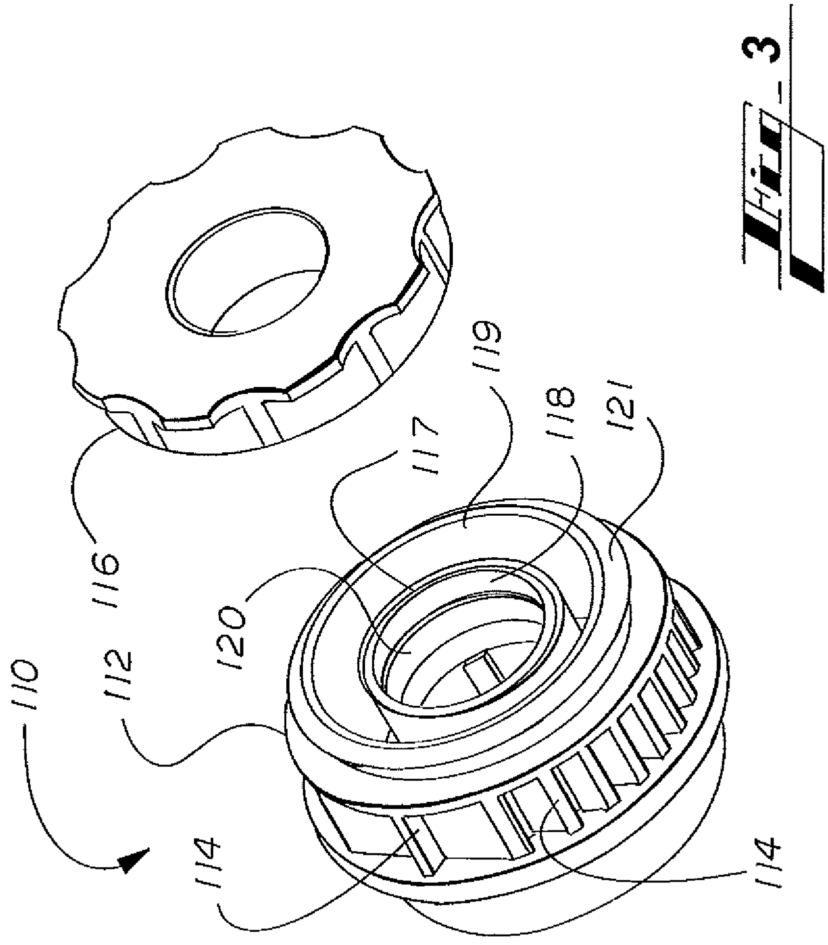
Figure 4:
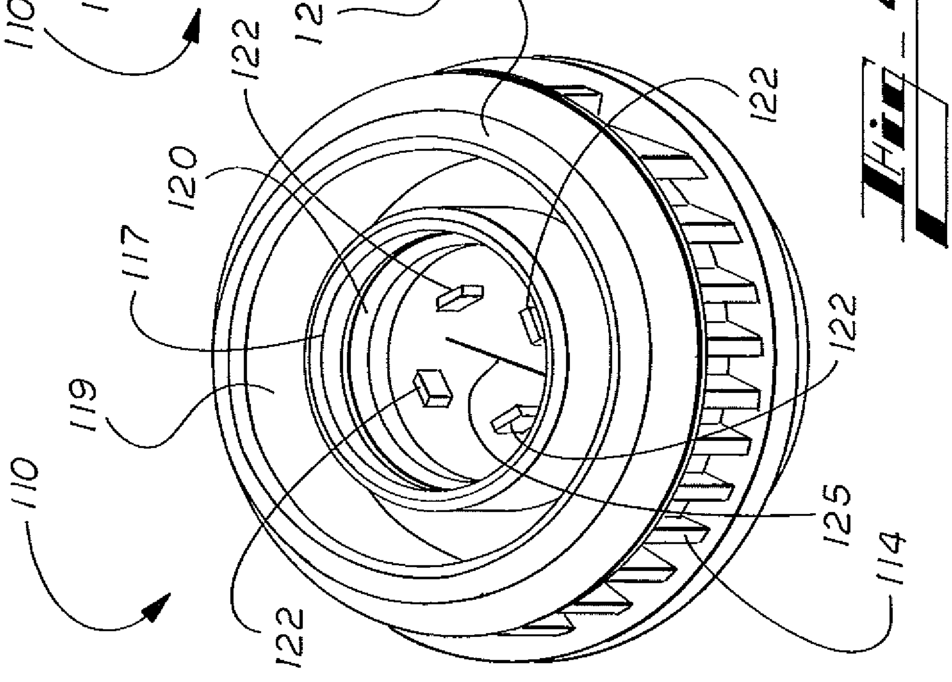

The bag-side connector 110 is discussed in more detail with respect to FIGS. 2-7. FIGS. 2-4 illustrate views of the bag-side connector 110 including a valve case 112 having an external hand grip 114 and a cap 116 covering a portion of the bag-side connector 110 that engages the line-side connector 150. The external hand grip 114 allows the bag-side connector 110 to be fastened to a bag gland (not shown) via annular collars 126, 128, shown in FIGS. 5-7. The cap 116 covers the components of the bag-side connector 110 to protect and prevent contamination of the components. Annular collars 117, 119, and an engagement lip 121 are arranged and configured to engage a corresponding engagement lip 172 on the line-side bag 150, as shown, in FIGS. 8, 11 and 13, to fittingly secure the bag-side connector 110 to the line-side connector 150. The bag side connector 110 also includes a line-side interface 118 having a substantially cup-shaped elastomeric seal 120, longitudinal valve actuation members 122, and an elastomeric membrane 124. In at least one embodiment, the elastomeric membrane 124 is centrally disposed and includes one or more slit(s) 125, cut(s), or similar structure(s) that are arranged and configured to function as a one-way valve. The slit(s) 125 are arranged and configured to remain closed until a differential pressure is created across the elastomeric membrane 124. The elastomeric membrane 124 remains closed before and after the bag-side connector 110 is connected to the line-side connector 150 and only opens when vacuum is applied to vacuum line 155 creating a differential pressure between the two sides of the membrane 124. The one-way valve created by the elastomeric membrane prevents the mixing of product from within the bag gland and in the line, and reduces the risk of contamination of the bag when connected to the line by reducing the introduction, for example, of microbiological contaminants and other foreign matter.

Figure 5:
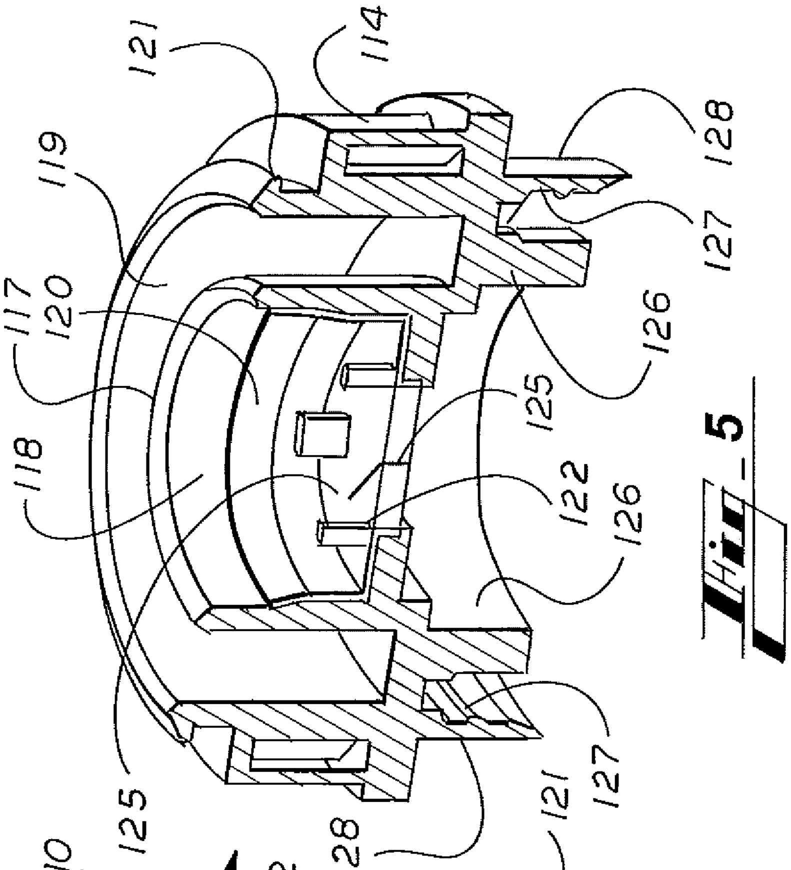
FIGS. 5-7 illustrate perspective cutaway views of an example of the bag-side connector in accordance with an embodiment of the present disclosure.
Figure 6:
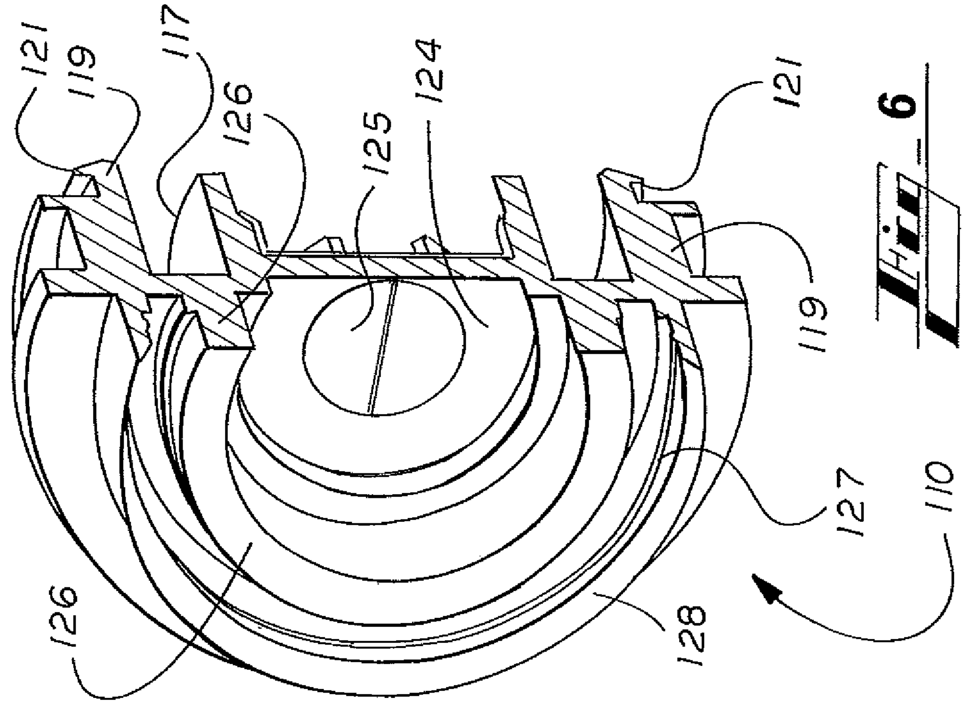
Figure 7:
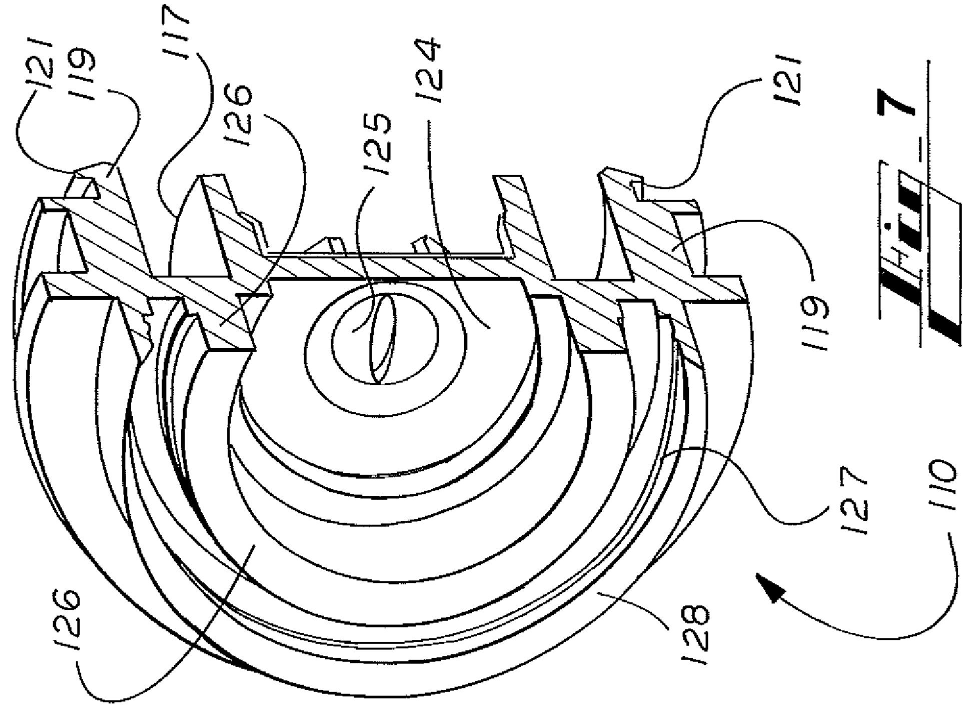

FIGS. 5-7 illustrate cutaway views of the bag-side connector 110 including the components on the bag-side of the bag-side connector 110. In addition to the components discussed above, the bag-side connector 110 includes annular collars 126, 128, having at least one gland interface 127 arranged and configured to engage the bag gland. A variety of suitable fasteners may be used to fasten the bag-side connector 110 to the bag gland including, for example, threaded connectors, pressure fittings, snap fittings, and the like. The annular collar 126 creates an opening that exposes the product within the bag gland to the elastomeric membrane 124. The elastomeric membrane 124 remains closed both prior to and after being connected to the line-side connector 150. The slit(s) 125 of elastomeric membrane 124 open only after pressure is applied to the membrane creating a differential pressure across the membrane sufficient to displace the slit(s) 125. As illustrated in FIG. 7, upon the application of sufficient pressure, the slit(s) 125 of elastomeric membrane 124 are displaced such that product can be dispensed from the bag through the slit(s) 125. As illustrated in FIG. 6, upon the pressure being removed from the elastomeric membrane 124, the pressure across the elastomeric membrane 124 returns substantially to equilibrium and the slit(s) 125 return to a closed position. The slit(s) remain closed until pressure is again applied to the elastomeric membrane 124.

Figure 8:
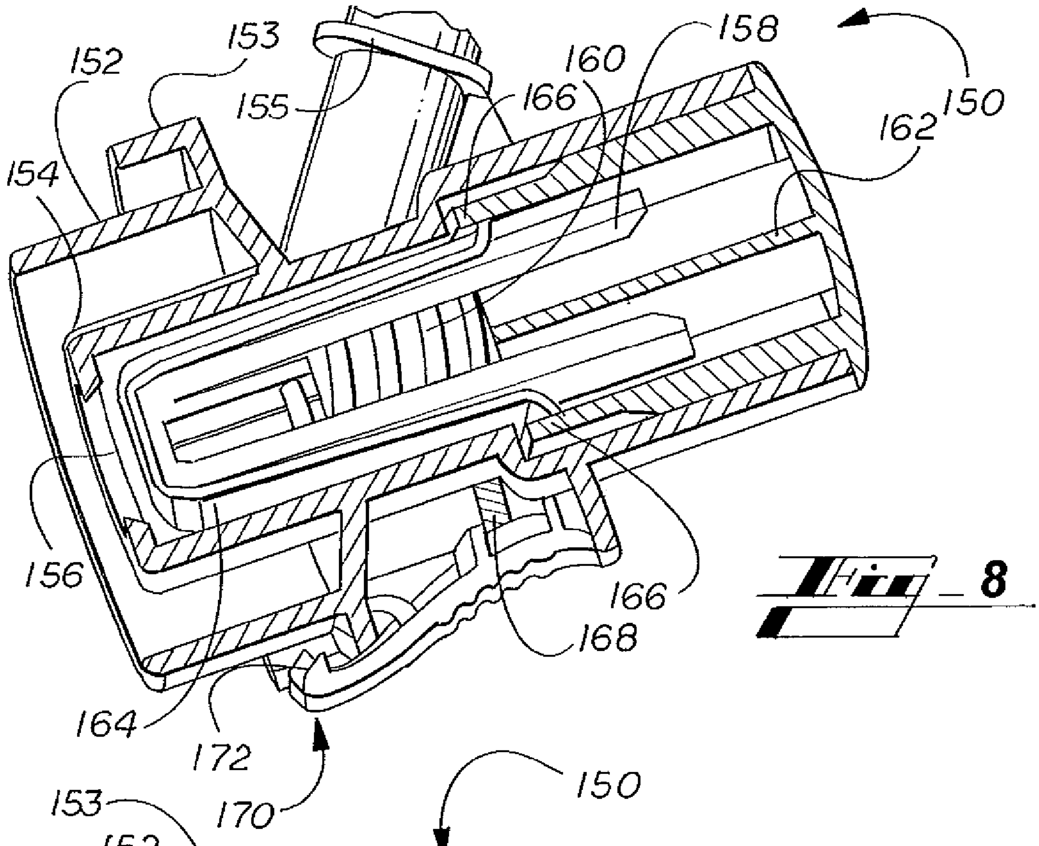
FIG. 8 illustrates a perspective cutaway view of an example of the line-side connector in accordance with an embodiment of the present disclosure.
Figure 9:
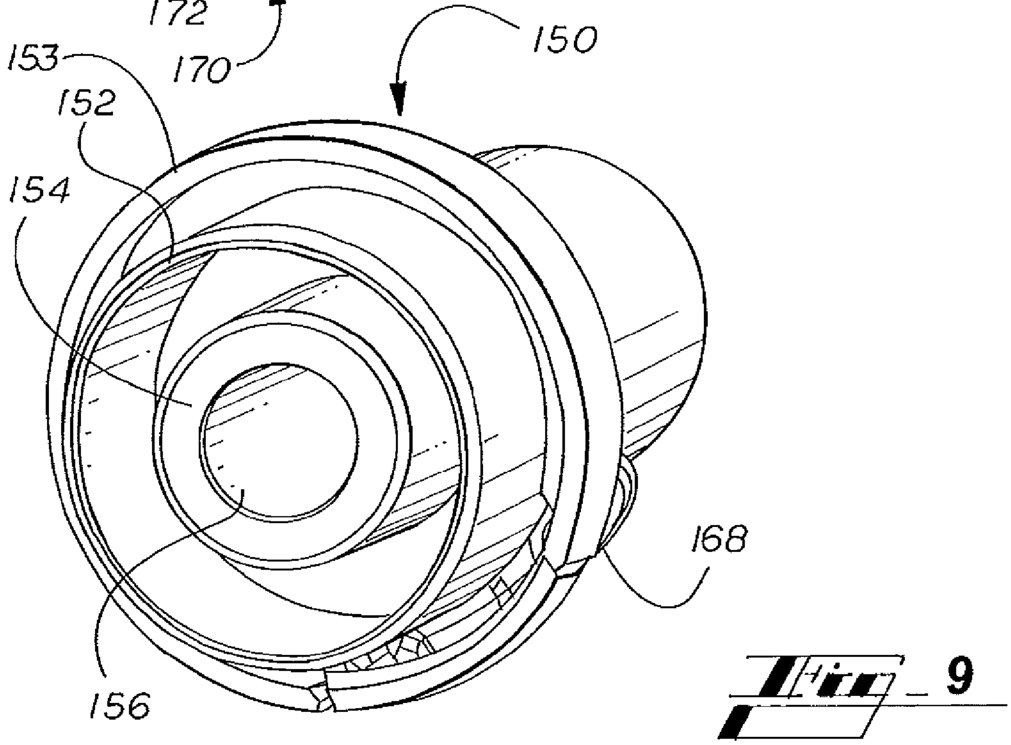
FIG. 9 illustrates a perspective view of an example of the line-side connector in accordance with an embodiment of the present disclosure, including the nose.

FIGS. 8 and 9 illustrate the line-side connector 150 in accordance with an embodiment of the present disclosure. The line-side connector 150 includes annular collars 152 and 153 that are arranged and configured to fittingly engage annular collars 117, 119 of the bag-side connector 150. The annular collar 152 surrounds a nose 154 that extends longitudinally within the line-side connector 150. The nose 154 includes a substantially centrally disposed opening 156. The nose 154 and the opening 156 are arranged and configured to be in fluid communication with the elastomeric membrane 124 and slit(s) 125, upon connection of the line-side connector 150 to the bag-side connector 110. The nose 154 substantially encloses at least a portion of a longitudinally extending elastomeric boot 164. The elastomeric boot 164 encloses thermoplastic plunger 158 and a spring 160 to create a valve 158, 160, 164.

The elastomeric boot 164 also includes one or more seals 166, such as gator seals, that are arranged and configured to be longitudinally displaced thereby creating a flow path between the interior of connector body and the exterior of the elastomeric boot 164/plunger 158 upon the plunger 158 being deformed by the valve actuation post(s) 122 of bag-side connector 110. The seals 166 also isolate the plunger 158 and spring 160 from product flowing through the opening 156 and along the side of the elastomeric boot 158. The one or more seals 166 isolate the plunger 158 and spring 160 from the product which helps to eliminate dead-spots within the flow path created by obstructions, build-up and the like. Isolating the plunger 158 and spring 160 from the product also improves cleaning of the bag-side connector 150. The thermoplastic plunger 158 also includes a spring retaining end cap 162 that encloses the thermoplastic plunger 158 and retains the spring 160 in place. The spring 160 urges the plunger 158 towards the opening 156 and maintains the seal (s) 166 in the closed position. The bag-side connector also includes an attachment/release element 170 having an engagement lip 172. The attachment/release element 170 and engagement lip 172 are arranged and configured to fittingly engage the annular collar 119 and engagement lip 121 of the bag-side connector 110 to secure the line-side connector 150 to the bag-side connector 110. The attachment/release element 170 includes a resilient actuation element 168, such as a stainless steel spring, that holds the attachment/release element 170 in position to ensure that the connectors 110, 150 remain fittingly and securely attached. The resilient actuation element 168 also allows the connectors 110, 150 to be readily disconnected.

Figure 10:
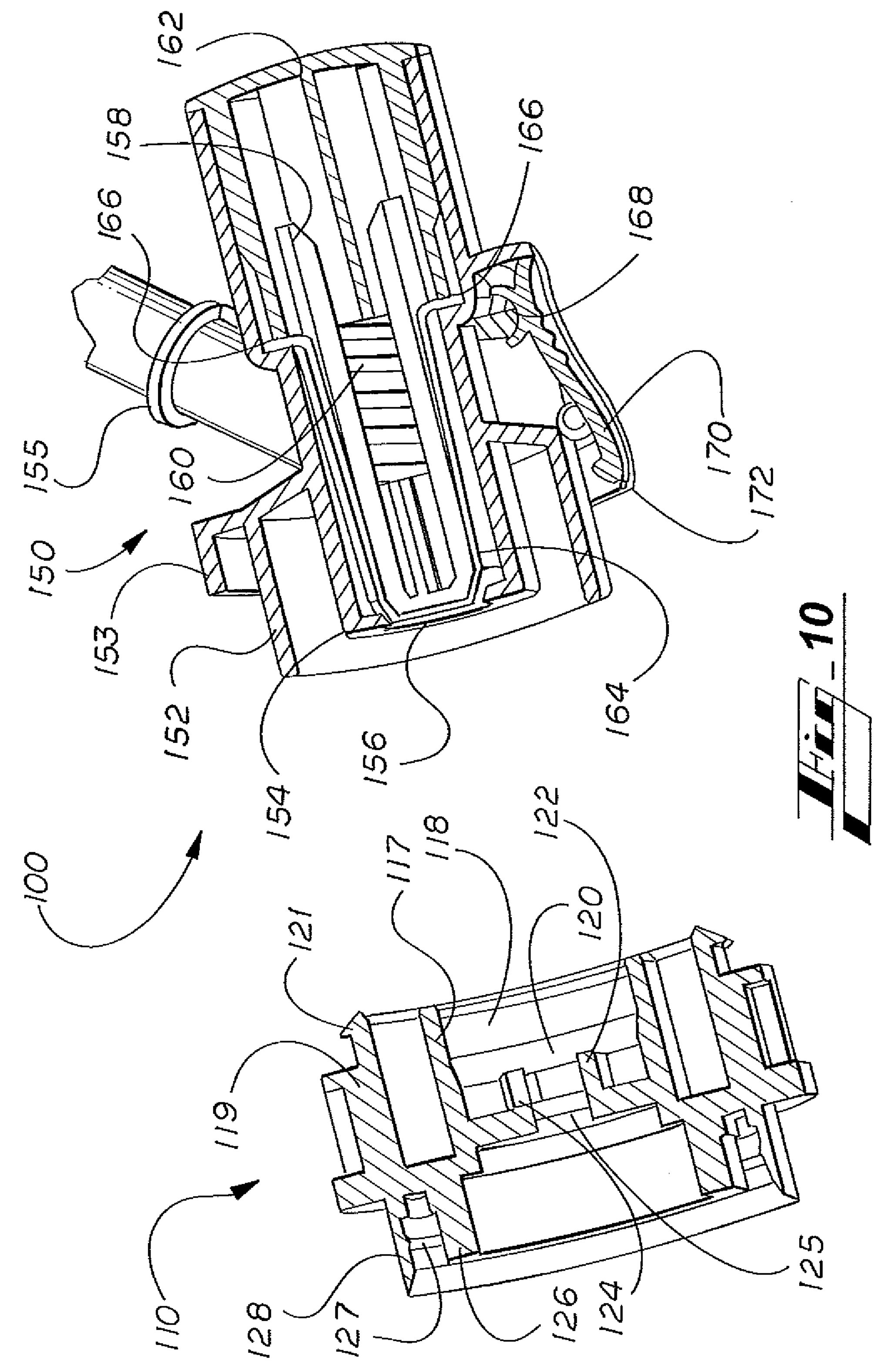
FIGS. 10-12 illustrate the bag-side connector and line-side connector of the connector system in accordance with an embodiment of the present disclosure, prior to, during, and after connection, respectively.
Figure 11:
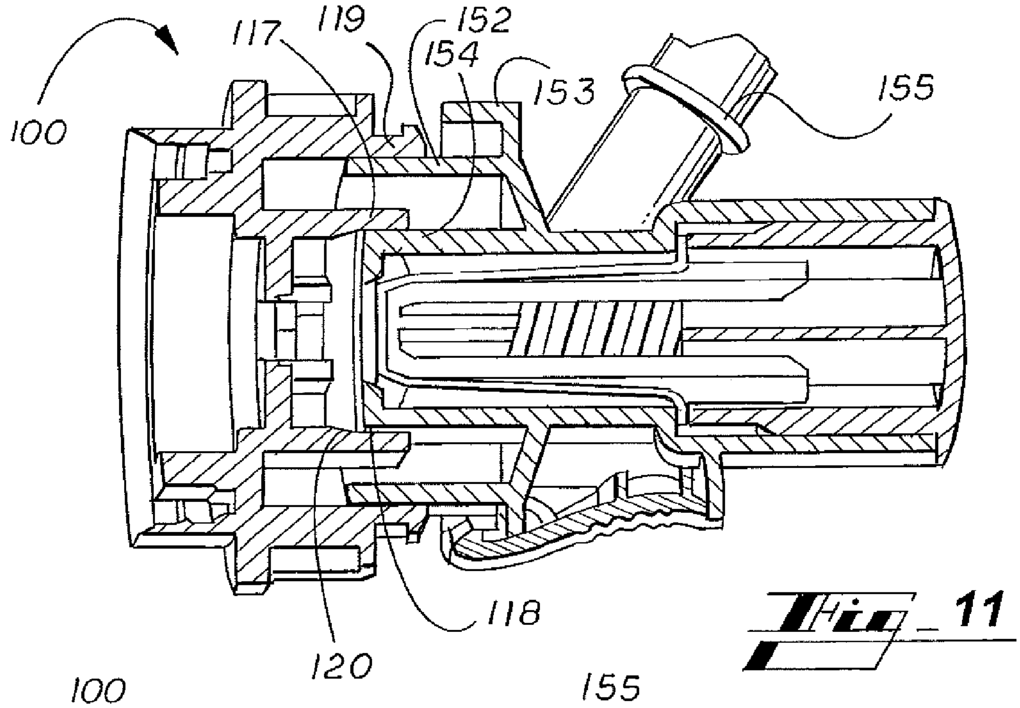
Figure 12:
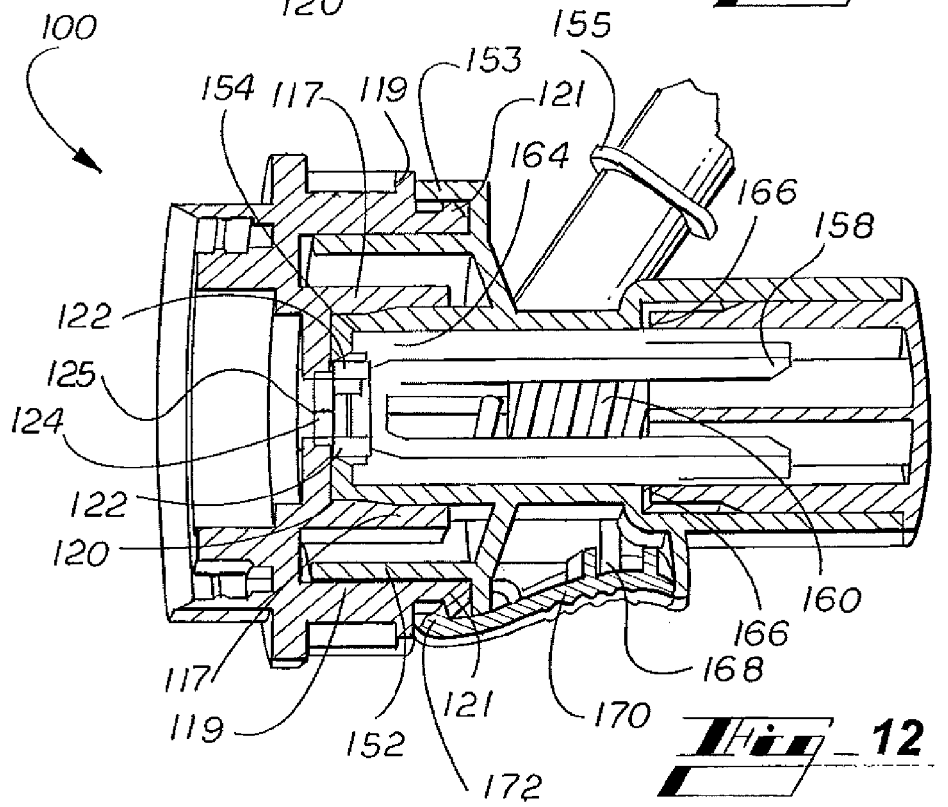

FIGS. 10-12 illustrate the connector system 100 according to at least one embodiment of the present disclosure in various stages of use. FIG. 10 illustrates the connector system 100, including bag-side connector 110 and line-side connector 150, prior to attachment. FIG. 11 illustrates the connector system 100, including bag-side connector 110 and line-side connector 150, during attachment. FIG. 12 illustrates the connector system 100, including bag-side connector 110 and line-side connector 150, after attachment. The following discussion provides an overview of the deployment of the connector system 100. The cap (not shown) must be removed from the bag-side connector 110 prior to connection in order to expose the annular collars 117, 119, the attachment lip 121 and other components (discussed above). While disengaged the valve arrangement of each connector remains closed, i.e., the elastomeric membrane 124 and the slit(s) 125 combination of bag-side connector 110 and the plunger 158, the elastomeric boot 156, and the spring 162 combination of the line-side connector 150 remain closed while the connectors are disengaged. In order to connect to two connectors 110, 150, the bag-side connector 110 and line-side connector 150 are urged together such that the annular rings 117, 119 and the annular rings 152, 153 engage each other, see FIG. 11. As the connectors 110, 150 engage each other the nose 154 of the connector 150 fittingly engages the cup-shaped elastomeric seal 120 at the line-side interface 118 to seal the line-side connector 150 into the bag-side connector 110. As the two connectors 110, 150 are urged together the valve arrangements of each connector remains closed. As the two connectors 110, 150 are urged together, the attachment lips 121 of the bag-side connector 110 and the attachment lip 172 of the line-side connector 150 snap together to fittingly secure to each other. When the two connectors are secured to each other, the valve actuation member(s) 122 deform the plunger 158 thereby opening the valve of the line-side connector 150. The valve (elastomeric membrane 124) of the bag-side connector remains closed until pressure is applied to the membrane 124 to create a differential pressure sufficient to open the slit(s) 125 of the membrane 124. The slit(s) 125 are arranged and configured to remain closed until a differential pressure is created across the elastomeric membrane 124. The elastomeric membrane 124 remains closed before and after the bag-side connector 110 is connected to the line-side connector 150 and only opens when vacuum is applied to vacuum line 155 creating a differential pressure across the two sides of the membrane 124.

Figure 13:
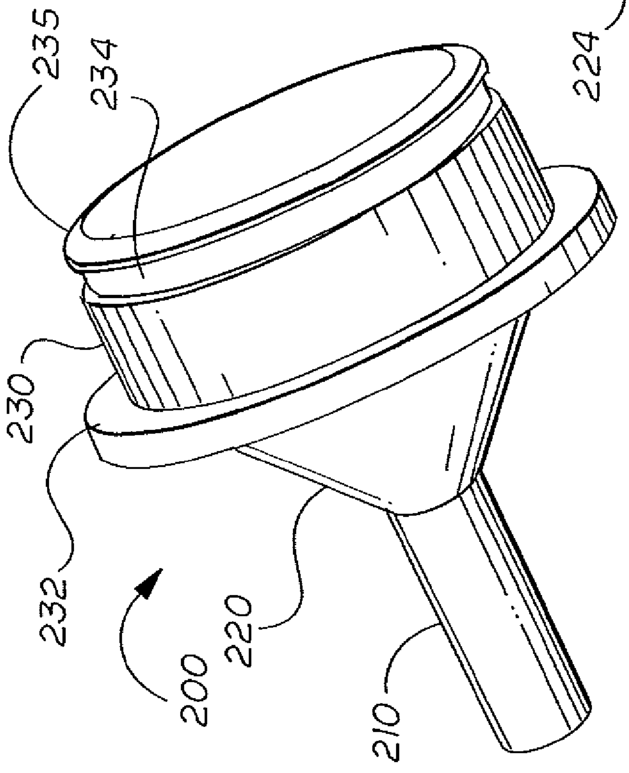
FIGS. 13-14 illustrate a cleaning element in accordance with at least one embodiment of the present disclosure.
Figure 14:
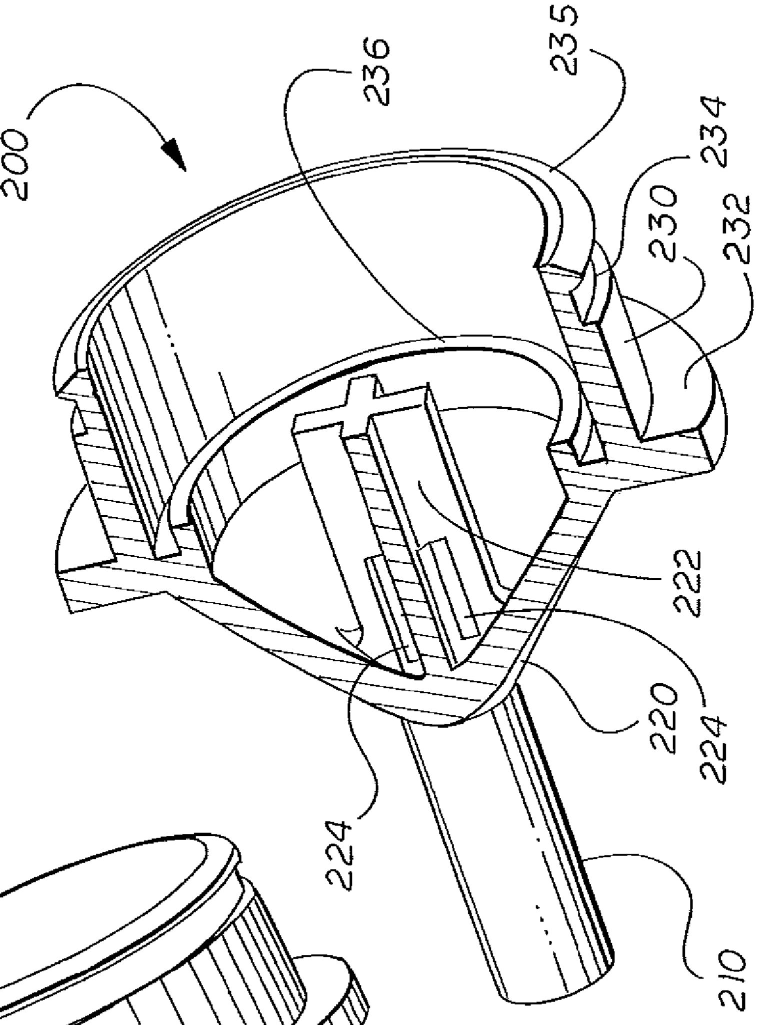
Figure 15:
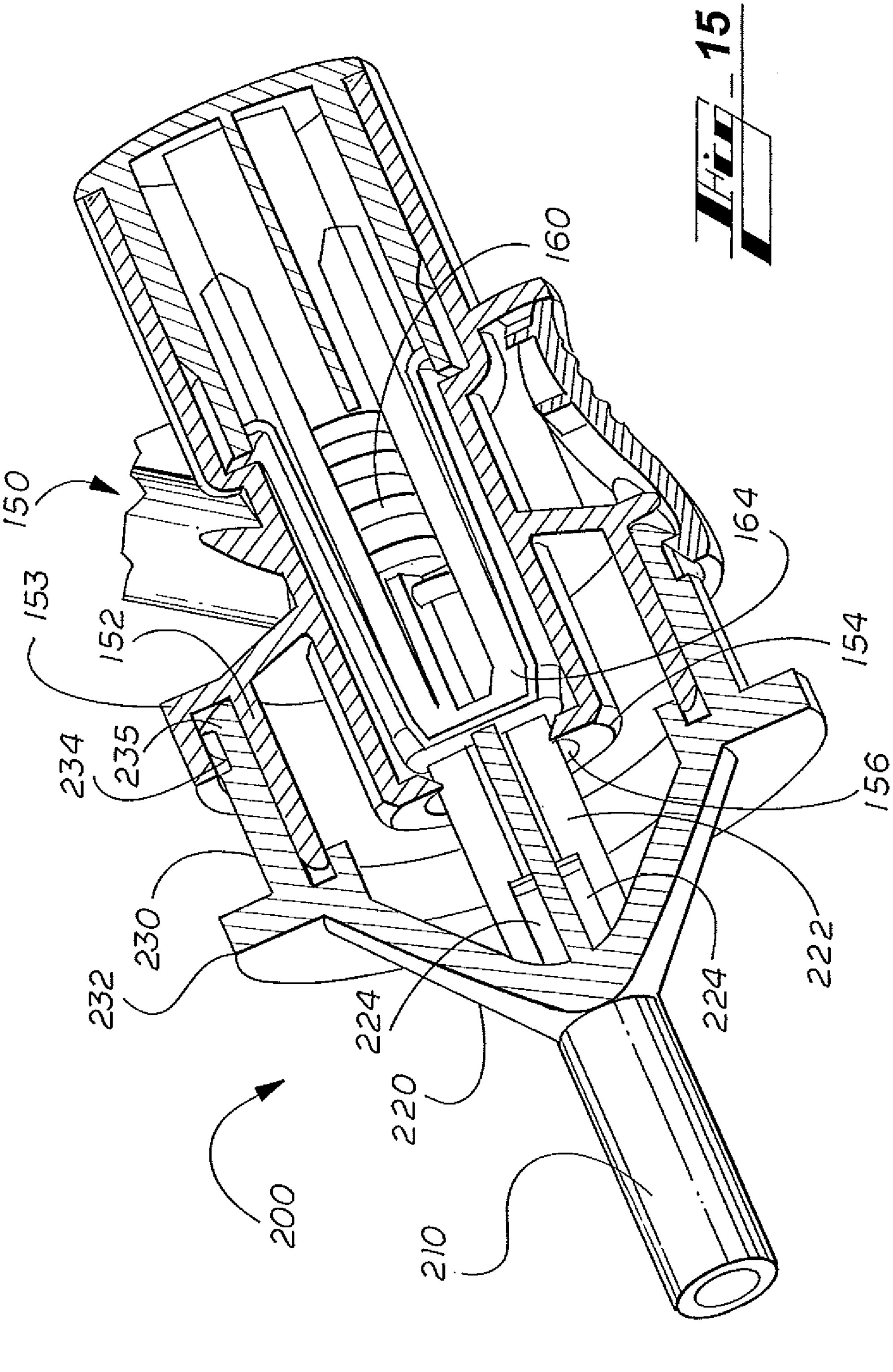
FIG. 15 illustrates the cleaning element as disclosed in FIGS. 13-14, in use.

FIGS. 13-14 illustrate a cleaning element in accordance with at least one embodiment of the present disclosure. FIG. 15 illustrates the cleaning element as disclosed in FIGS. 13-14, in use. The Clean-In-Place ("CIP") cleaning element 200 is arranged and configured for use with a fluid distribution system, e.g., the line-side connector 150 of the BIB connector system 100. The cleaning element 200 attaches to the line-side connector 150 such that the line-side connector 150 can be cleaned. The cleaning element 200 allows a cleaning solution to be applied to the fluid flow surfaces of the line-side connector 150 including, for example, the annular collar 152, nose 154, opening 156, and elastomeric boot 164 such that any product or other buildup on the fluid flow surfaces of the line-side connector 150 can be thoroughly cleaned.

The cleaning element 200 includes an in-flow line 210 for connection with a cleaning solution source (not shown). The in-flow line 210 connects to a nozzle or fluid body 220 that is arranged and configured to direct the flow of fluid through the cleaning element 200. The fluid body 220 includes a valve opening structure 222 that is arranged and configured to depress and open the valve of line-side connector 150 (formed by the plunger 158, elastomeric boot 164, and spring 160) when the cleaning element 200 is connected to the line-side connector 150. The fluid body 220 also includes one or more fluid flow openings 224 that allow fluid to flow from the in-flow line 210 into the fluid body 220. The fluid body 220 and valve opening structure 222 are arranged and configured to evenly distribute the fluid (cleaning solution) flowing from the cleaning element 200 to the line-side connector 150 such that the cleaning solution is applied to all surfaces of the line-side connector 150. For example, the nozzle shape of the fluid body 220 allows the velocity of the fluid flow to be increased and enables the fluid flow to be more effectively directed through the fluid body 220. Also, the valve opening structure 222 includes partitions that help to evenly distribute the fluid flowing through the fluid body 220. The cleaning element 200 attaches to the line-side connector 150 via an engagement structure to create a substantially fluidic seal. The engagement structure is formed by flange 232, annular collar 236, and annular collar 230 having a circumferential groove 234 and an engagement lip 235. Optionally, a seal such as an O-ring seal (not shown) may be disposed within the circumferential groove 234 to assist creating a fluidic seal between the cleaning element 200 and the line-side connector 150.

In use, the annular collars 230, 236 and engagement lip 235 of cleaning element 200 fittingly engage the annular collars 152, 153 and engagement lip 172 of the line-side connector 150 to create a substantially fluidic seal. The cleaning element 200 allows a fluid, e.g., a cleaning solution, water, chemical solution, etc., to be applied to the fluid flow surfaces of the line-side connector 150. The fluid is applied to the cleaning element 200 from a fluid source (not shown) via in-flow line 210. The fluid may be applied by a variety of methods including, for example, a pressurized fluid source or a vacuum applied to the line-side connector 150 via vacuum line 155. In-flow line 210 is connected to the fluid body 220 and fluid openings 224 such that fluid flows from the in-flow line 210 into the fluid body 220. The valve opening structure 222 passes through opening 156 of the nose 154 of line side connector 150. The valve opening structure 222 depresses and opens the valve (formed by plunger 158, spring 160 and elastomeric boot 164) which allows the fluid to flow from the fluid body 220 through opening 156 of nose 154, along the elastomeric boot 164 of plunger 158, and out of the line-side connector 150 via vacuum line 155. The fluid flow through the line-side connector 150 allows for any product or debris disposed on the surfaces of the line-side connector 150 to be cleaned by the fluid.

Figure 17:
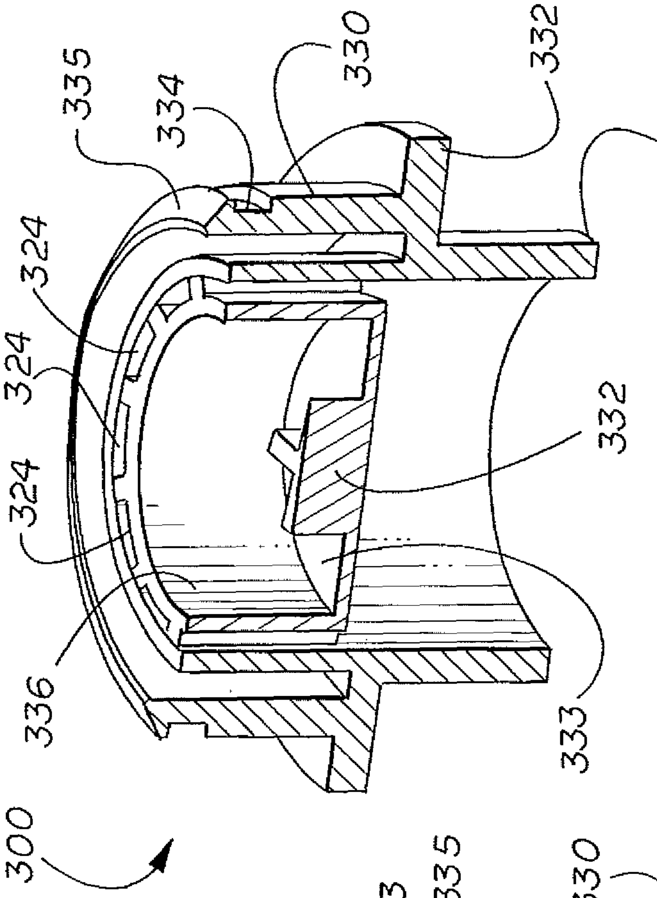
FIGS. 16-17 illustrate a cleaning element in accordance with at least one alternative embodiment of the present disclosure.
Figure 16:
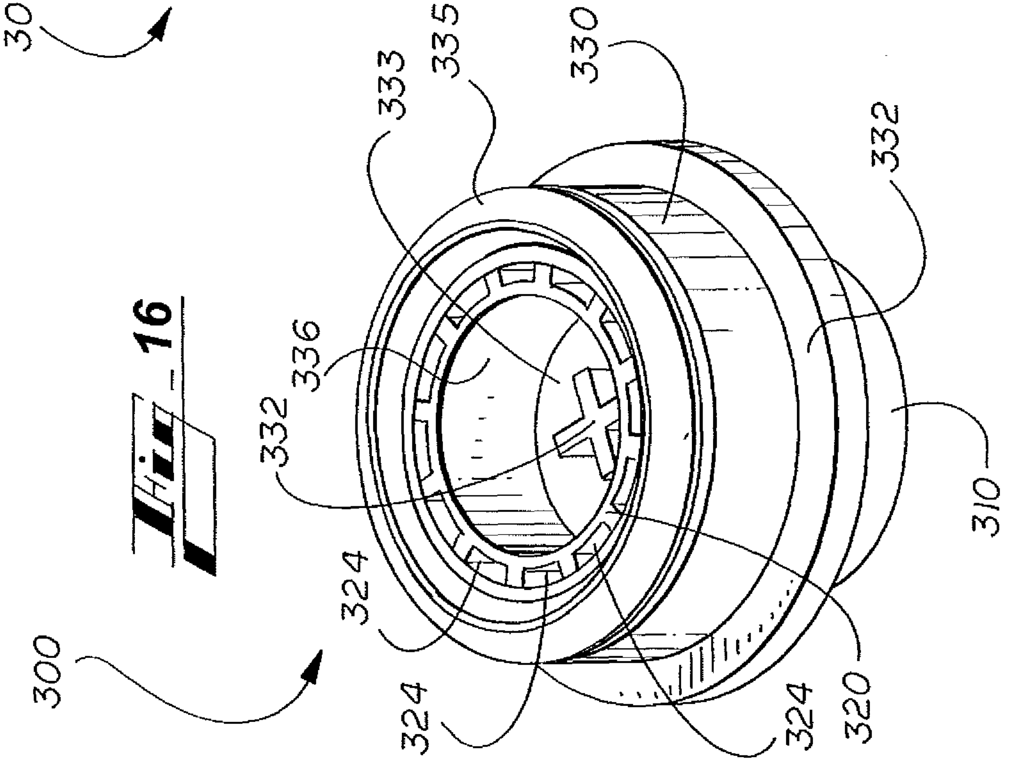
Figure 18:
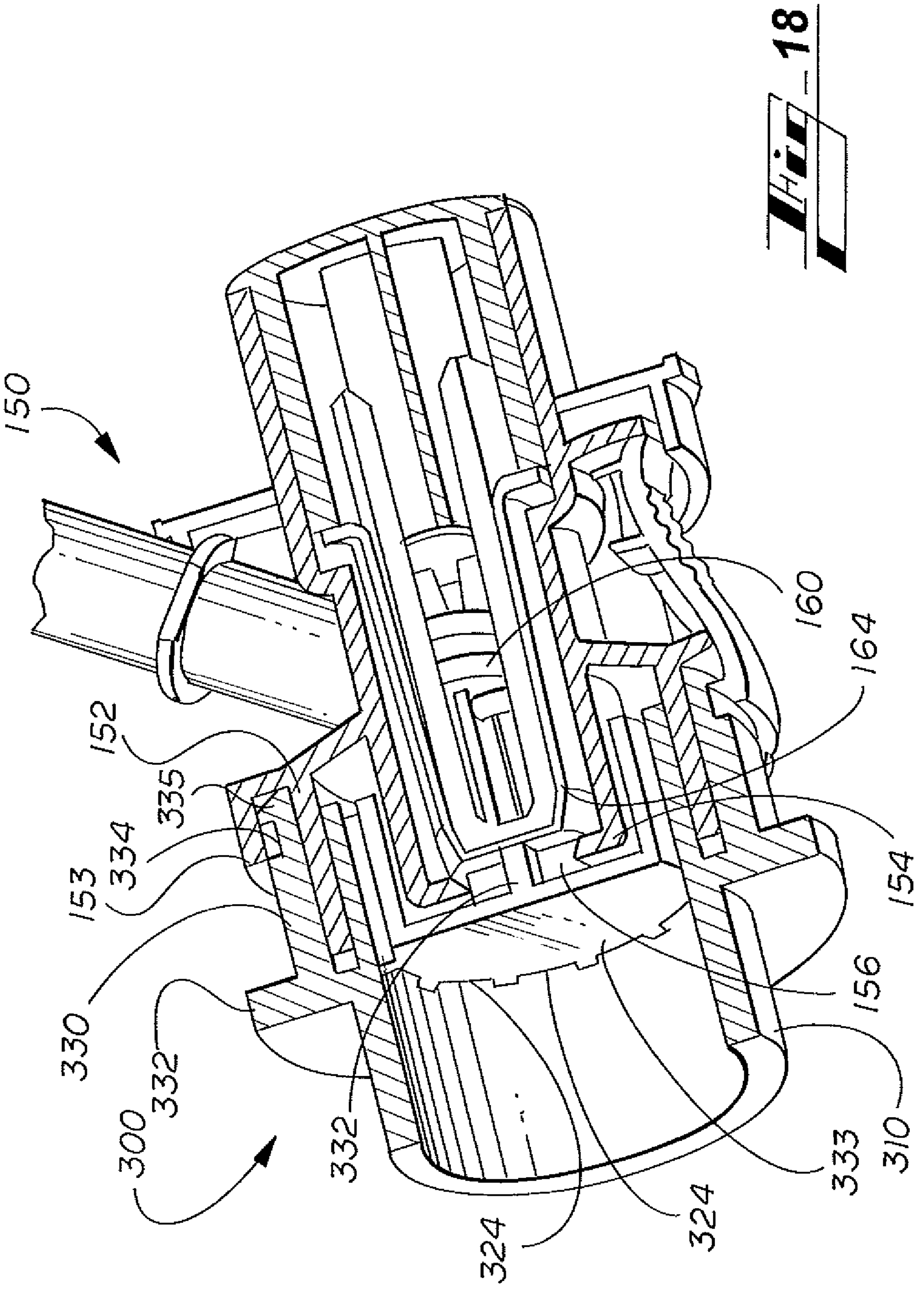
FIG. 18 illustrates the cleaning element as disclosed in FIGS. 16-17, in use.

FIGS. 16-17 illustrate a cleaning element in accordance with at least one alternative embodiment of the present disclosure. FIG. 18 illustrates the cleaning element as disclosed in FIGS. 16-17, in use. The CIP cleaning element 300 provides an alternative embodiment of the cleaning element 200, illustrated above in FIGS. 13-15. The cleaning element 300 is arranged and configured for use with a fluid distribution system, e.g., the line-side connector 150 of the BIB connector system 100. The cleaning element 300 attaches to the line-side connector 150 such that the line-side connector 150 can be cleaned. The cleaning element 300 is arranged and configured to depress and open the valve of line-side connector 150 (formed by the plunger 158, elastomeric boot 164, and spring 160) when the cleaning element 300 is connected to the line-side connector 150. The cleaning element 300 allows a cleaning solution or other fluid to be applied to the fluid flow surfaces of the line-side connector 150 including, for example, the annular collar 152, nose 154, opening 156, and elastomeric boot 164 such that any product or other buildup on the fluid flow surfaces of the line-side connector 150 can be thoroughly cleaned.

The cleaning element 300 includes an annular collar 310 for connection with a fluid source (not shown), e.g., as cleaning solution, water, chemical solution, etc. The annular collar 310 extends longitudinally and connects to a flange having an inner annular collar 320 and outer annular collar 330. A fluid body 336, having a fluid dispersion plate 333 and a valve opening structure 332, is disposed within the inner annular collar 320. The valve opening structure 332 is disposed substantially in the center of the fluid dispersion plate 333. A plurality of circumferentially-spaced fluid flow channels 324 are formed between the inner annular collar 320 and the fluid body 336. The fluid flow channels 324 allow fluid to flow from the annular collar 310 into the fluid body 336. The fluid dispersion plate 333 forms the bottom of the fluid body 336 and causes the fluid to flow through the fluid flow channels 324 and into the interior of the fluid body 336, before passing through opening 156 of nose 154 and along the elastomeric boot 164 of plunger 158, before finally passing out of the line-side connector via vacuum line 155. The fluid body 336, fluid dispersion plate 333, and fluid flow channels 324 are arranged and configured to evenly distribute the fluid flowing from the from the cleaning element 300 to the line-side connector 150 such that the fluid is applied to all surfaces of the line-side connector. For example, the circumferentially spaced fluid flow channels 324 allows the fluid flow to be effectively directed towards the perimeter of the line-side connector 150 such that the fluid flows along the walls of the nose 154 before passing through opening 156. The cleaning element 300 attaches to the line-side connector 150 via an engagement structure to create a substantially fluidic seal. The engagement structure is formed by flange 332, annular collar 320, and annular collar 330 having a circumferential groove 334 and an engagement lip 335. A seal such as an O-ring seal (not shown) may be optionally disposed within the circumferential groove 234 to help form a fluidic seal between the cleaning element 300 and the line-side connector 150.

In use, the annular collars 320, 330 and engagement lip 335 of cleaning element 300 fittingly engage the annular collars 152, 153 and engagement lip 172 of the line-side connector 150 to create a substantially fluidic seal. The cleaning element 300 allows a fluid, e.g., a cleaning solution, water, chemical solution, etc., to be applied to the fluid flow surfaces of the line-side connector 150. The fluid is applied to the cleaning element 300 from a fluid source (not shown) in fluid communication with annular collar 310. The fluid may be applied by a variety of methods including, for example, a pressurized fluid source, or a vacuum applied to the line-side connector 150 via vacuum line 155. Annular collar 310 is fluidly connected to the fluid body 336 via fluid flow channels 324 such that fluid flows from the fluid source (not shown), through the annular collar 310, and into the fluid body 220. The valve opening structure 322 passes through opening 156 of the nose 154 of line side connector 150. The valve opening structure 322 depresses and opens the valve (formed by plunger 158, spring 160 and elastomeric boot 164) which allows the fluid to flow from the fluid body 336 through the opening 156 and through the vacuum line 155 such that any product or debris disposed on the surfaces of the line-side connector 150 can be cleaned by the fluid.

While the present disclosure has been described in terms of particular preferred and alternative embodiments, it is not limited to those embodiments. Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

We claim:

1. A product dispenser connector system, comprising:

a bag connector, comprising:

a body member having at least one attachment structure;

at least one annular collar disposed within the body member, wherein the at least one annular collar is arranged and configured to engage a line connector;

an elastomeric membrane disposed within the at least one annular collar, wherein the elastomeric membrane includes at least one slit, wherein the elastomeric membrane includes a substantially cup-shaped structure;

at least one actuation member disposed within the at least one annular collar; and, a bag interface, wherein the bag interface is arranged and configured to fittingly engage a gland; and the line connector, comprising:

a body member having at least one attachment structure;

at least one annular collar disposed within the body member, wherein the at least one annular collar is configured and arranged to engage the bag connector;

a cylindrical member surrounded by the at least one annular collar, the cylindrical member having an opening formed therein, wherein the cylindrical member fittingly engages the cup-shaped elastomeric to form a seal between the at least one annular collar of the bag connector and the cylindrical member;

a plunger disposed within the cylindrical member;

a resilient member in communication with the plunger, wherein the resilient member urges the plunger towards the opening in the cylindrical member; and a boot substantially surrounding at least an end of the plunger;

wherein the bag connector and the line connector fittingly engage to be in fluid communication with each other.

2. The system according to claim 1, wherein the gland stores a product to be dispensed.

3. The system according to claim 2, wherein the product to be dispensed is a fluid.

4. The system according to claim 1, wherein the at least one attachment structure of the bag connector includes an attachment lip that engages a corresponding structure of the line connector.

5. The system according to claim 1, wherein the at least one actuation member of the bag connector is arranged and configured to depress the plunger of the line connector.

6. The system according to claim 1, wherein the line connector is arranged and configured to dispense a product received via the bag connector.

7. The system according to claim 6, wherein the product to be dispensed is a fluid.

8. The system according to claim 1, wherein the at least one attachment structure of the line connector includes an attachment lip that engages a corresponding structure of the bag connector.

9. The system according to claim 1, wherein the plunger of the line connector is substantially cylindrical.

10. The system according to claim 1, wherein the resilient member of the line connector comprises a spring.

11. The system according to claim 1, wherein the boot of the line connector comprises an elastomeric material.

* * * * *